United States Patent Office 3,152,157
Patented Oct. 6, 1964

---

3,152,157
PREPARATION OF CYCLOPENTADIENYL COMPOUNDS OF GROUPS IIIA, IIIB, VB AND VIB METALS
Hymin Shapiro, Detroit, Earl G. De Witt, Royal Oak, and Jerome E. Brown, Detroit, Mich., assignors to Ethyl Corporation, New York, N.Y., a corporation of Virginia
No Drawing. Filed Mar. 22, 1954, Ser. No. 417,920
7 Claims. (Cl. 260—438)

This invention relates to a process for the preparation of metallic and metalloidic compounds containing the cyclopentadiene group or configuration within the molecule. In particular, this invention relates to the preparation of cyclopentadienyl moiety-containing compounds of the metal and metalloid elements of Groups IB, IIB, IIIA, IIIB, IVA, IVB, VA, VB, VIB and VIIB of the Periodic Table.

This is a continuation-in-part of our applications, Serial Number 297,392, filed July 5, 1952, and Serial No. 325,224, filed December 10, 1952, now U.S. Patent 2,818,-416.

A method for preparing a metallic cyclopentadienyl moiety-containing compound, namely dicyclopentadienyl-iron, is the interaction of a cyclopentadienyl Grignard reagent with ferric chloride. This kind of process involves a number of steps requiring extremely close control and is, therefore, quite costly. One serious shortcoming of this method is the low yields in which the products are obtained. Other methods suggested in the prior art have met with little more success. It can be seen, therefore, that a need exists for a process of preparing cyclopentadienyl moiety-containing compounds of the metal and metalloid elements of Groups IB, IIB, IIIA, IIIB, IVA, IVB, VA, VB, VIB and VIIB of the Periodic Table of elements in higher yields. By "cyclopentadienyl moiety-containing" we mean compounds containing the cyclopentadiene group or configuration within the hydrocarbon portion of the molecule.

It is, therefore, an object of the present invention to provide a novel process for preparing cyclopentadienyl moiety-containing compounds of the metal and metalloid elements of Groups IB, IIB, IIIA, IIIB, IVA, IVB, VA, VB, VIB and VIIB of the Periodic Table. It is a further object of this invention to provide a process for the preparation of cyclopentadienyl compounds of the metal and metalloid elements of the above mentioned groups of the Periodic Table whereby such products can be obtained in better yields. Additional important objects of our invention will become apparent from the discussion which hereinafter follows.

In accordance with the instant invention the above and other objects can be accomplished by preparing the cyclopentadienyl moiety-containing compounds of elements of Groups IB, IIB, IIIA, IIIB, IVA, IVB, VA, VB, VIB and VIIB of the Periodic Table by a process comprising the interaction of a cyclopentadienyl alkali metal compound with a salt of the desired metal or metalloid element. In other words, we have found that we can react a cyclopentadienyl-type alkali metal compound with an anhydrous halide of a metal or metalloid of the above named groups to produce cyclopentadienyl-type compounds of these groups as, for example, the process of preparing cyclopentadienyl manganese which comprises reacting an anhydrous manganese halide with cyclopentadienyl sodium, and also, the process of preparing dicyclopentadienyl titanium dibromide which comprises reacting an anhydrous titanium tetrabromide with cyclopentadienyl potassium. One advantage of this process is the high yields in which the products are obtained. Cyclopentadienyl moiety-containing hydrocarbons that can be used in forming the cyclopentadienyl alkali metal compounds used in the process of this invention, can be represented by the formula

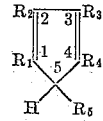

where $R_1$, $R_2$, $R_3$, $R_4$ and $R_5$ can be the same or different and can be hydrogen or a hydrocarbon group containing from one to about twenty carbon atoms, wherein said hydrocarbon group can be aliphatic, aromatic and/or cycloaliphatic substituted aliphatic, alicyclic, aromatic and/or aliphatic substituted alicyclic, aromatic, aliphatic and/or alicyclic substituted aromatic, and wherein the aliphatic portions of the group can be straight or branched chain and can have one or more units of unsaturation therein. Examples of such compounds are cyclopentadiene, 1-methyl cyclopentadiene, 1-ethenyl cyclopentadiene and the like. Also, the $R_1$ and $R_2$ groups as well as the $R_3$ and $R_4$ groups can be linked together by a carbon-to-carbon bridge as in indene and 1,2,3,4-tetrahydrofluorene for example, where six-membered rings are fused onto the five-membered cyclopentadiene ring. Other examples of these compounds are given hereinbelow. Cyclopentadienyl alkali metal compounds result when the hydrogen shown in the above formula, that is, the hydrogen in the 5 position, is substituted by an alkali metal. Illustrative examples are cyclopentadienyl sodium, 1-methyl cyclopentadienyl sodium, cyclopentadienyl lithium, indenyl lithium, fluorenyl sodium, and the like.

Non-limiting examples of products obtained by the process of this invention are: tripentacyclodienyl boron which can be obtained by the reaction of cyclopentadienyl lithium with anhydrous boron trichloride, bis(1-methyl cyclopentadienyl) vanadium dibromide which can be obtained by the reaction of cyclopentadienyl potassium with anhydrous vanadium tetrabromide, bis(2,3-dimethyl cyclopentadienyl)zirconium dibromide which can be obtained by the reaction of cyclopentadienyl sodium with zirconium tetrabromide, and the like. A more extensive list of products is given hereinbelow.

The general method for preparing the cyclopentadienyl moiety-containing compounds of the metal and metalloid elements of Groups IB, IIB, IIIA, IIIB, IVA, IVB, VA, VB, VIB and VIIB, comprises the interaction of a cyclopentadienyl alkali metal compound with a salt of the desired element. An example of this is the interaction of a cyclopentadienyl alkali metal compound with an anhydrous halide of one of the metals and metalloid elements of Groups IB, IIB, IIIA, IIIB, IVA, IVB, VA, VB, VIB and VIIB of the Periodic Table. In carrying out this process the cyclopentadienyl-type alkali metal compound is usually added to the halide of the metal or metalloid element, although the order of addition can be reversed. It is preferred to have the halide of the required element dissolved in a suitable solvent, illustrative of which are diethyl ether, benzene, toluene, and the like. The solvent serves the purpose of facilitating uniform contact between the two reagents and for moderating the reaction rate. The invention will be more fully understood by reference to the following set of illustrative examples, wherein all parts and percentages are by weight.

*Example I*

*Cyclopentadienyl lithium.*—Cyclopentadienyl lithium was obtained by preparing n-butyl lithium and reacting this compound with cyclopentadiene. According to this process, 68.5 parts of n-butyl bromide was added to 8.6 parts of lithium metal in anhydrous diethyl ether at a temperature of −10° C. The resultant ether solution of n- butyl lithium was filtered and then added to 20.4 parts of cyclopentadiene in ether. The product, cyclopentadienyl lithium settled out as a white solid, the completion of the reaction being evidenced by the cessation of butane evolution. The procedure followed in the above synthesis was that described in Organic Reactions, volume VI, pp. 352–353, John Wiley and Sons, Inc., New York (1951).

*Tricyclopentadienyl boron.*—The cyclopentadienyl lithium in ether, prepared as above, was slowly added with agitaion to 15.2 parts of anhydrous boron trichloride dissolved in 91 parts of anhydrous diethyl ether and contained in a vessel equipped with openings for charging and discharging liquids and fluids, means for refluxing liquids, temperature measuring devices, means for regulating temperature, and fitted with a mechanical agitator. The reaction resulted in the formation of an orange colored product. The ether-soluble product was removed from the unreacted ether-insoluble cyclopentadienyl lithium by filtration. Ammonia was bubbled through the ether solution to remove any unreacted boron trichloride which settled out as a solid ammonia addition compound. The ether layer was evaporated leaving an orange solid. This product turned blue-green on exposure to air. The ratio of the percentage by weight of carbon to the total of carbon, hydrogen and boron is 86 percent, which indicates that the product obtained in this reaction is $(C_5H_5)_3B$, calculated 87 percent carbon.

Equally good results are obtained when the teaching of the above example is employed in reacting other cyclopentadienyl-type alkali metal compounds with boron trihalides as, for example, the reaction between 1-methyl cyclopentadienyl sodium with boron tribromide in benzene to produce tris(1-methyl cyclopentadienyl)boron, the reaction between 3-phenyl cyclopentadienyl potassium with boron trifluoride in anhydrous anisole to produce tris(3-phenyl cyclopentadienyl)boron, the reaction between indenyl rubidium with boron triiodide in a solvent composed of a mixture of diethyl ether, benzene, and hexane to produce triindenyl boron, and the like.

*Example II*

*Dicyclopentadienyl titanium dibromide.*—Cyclopentadienyl lithium was prepared as described in Example I. To 118 parts of titanium tetrabromide in 400 parts of a benzene-ether solution there were added 87.7 parts of cyclopentadienyl lithium suspended in diethyl ether. The reaction was carried out in a vessel equipped as described in Example I. The reaction mixture was maintained at reflux temperature with constant agitation for a period of 7 hours. The solid violet colored product was insoluble in the reaction solvent. A 23 percent yield of dicyclopentadienyl titanium dibromide was obtained upon separation of the product from the solvent by vacuum filtration.

Equally good results are obtained when other cyclopentadienyl-type alkali metal compounds are reacted with titanium tetrahalides as, for example, the reaction between 2-amyl cyclopentadienyl sodium with titanium tetrachloride in toluene to produce bis(2-amyl cyclopentadienyl) titanium dichloride, the reaction between 2(2-phenylethyl) cyclopentadienyl cesium with titanium tetraiodide to produce bis(2(2-phenylethyl)cyclopentadienyl)titanium diiodide, the reaction between 1,2,3,4,5,6,7,8-octahydrofluorenyl potassium with titanium tetrachloride to produce bis(1,2,3,4,5,6,7,8-octahydrofluorenyl)titanium dichloride, and the like.

*Example III*

*Dicyclopentadienyl chromium bromide.*—Fifty-nine parts of cyclopentadienyl lithium were refluxed with 32 parts of anhydrous chromic tribromide in diethyl ether. Both of these reactants are considerably insoluble in diethyl ether but the reaction product produced a dark violet ether solution. The product was separated from the reaction mass by extraction with a benzene-ether mixture. Removal of the solvent by vacuum distillation left a blue solid product which did not melt or soften up to 285° C. An analysis for carbon, hydrogen and bromine showed this product to be dicyclopentadienyl chromium dibromide.

Other cyclopentadienyl moiety-containing chromium halide compounds can be obtained in a similar manner as, for example, the reaction between 2-isopropyl cyclopentadienyl sodium with chromium trichloride in benzene to produce bis(2-isopropyl cyclopentadienyl)chromium chloride, the reaction between 2,3-dimethyl cyclopentadienyl potassium with chromium trifluoride to produce bis(2,3-dimethyl cyclopentadienyl)chromium fluoride, and the like.

To make the cyclopentadienyl-type compounds by the process of this invention, the elements we can employ are copper, silver, and gold; that is, Group IB of the Periodic Table. Furthermore, we can employ zinc, cadmium, and mercury; that is, Group IIB of the Periodic Table. In addition, we can employ the elements of Group IIIA of the Periodic Table; that is, boron, aluminum, gallium, indium, and thallium. Likewise, we can employ the elements of Group IIIB of the Periodic Table; that is, scandium, yttrium, lanthanum, and actinium, including the lanthanum and actinium rare earth series of elements. Furthermore, we can employ the elements of Group IVA of the Periodic Table; that is, silicon, germanium, tin and lead. In addition, we can employ the elements of Group IVB of the Periodic Table; that is, titanium, zirconium and hafnium. Likewise, we can employ the elements of Group VA of the Periodic Table, such as arsenic, antimony and bismuth. Furthermore, we can employ the elements of Group VB of the Periodic Table; that is, vanadium, niobium, and tantalum. Likewise, we can employ the elements of Group VIB of the Periodic Table; that is, chromium, molybdenum, and tungsten. Furthermore, we can employ the elements of Group VIIB of the Periodic Table; that is, manganese, technetium, and rhenium.

As indicated hereinabove, the cyclopentadienyl-type compounds, from which the cyclopentadienyl alkali metal compounds employed in this process are obtained contain the characteristic cyclopentadienyl moiety or group. Examples of such compounds are:

1-methyl cyclopentadiene,
2,3-dimethyl cyclopentadiene,
2-isopropyl cyclopentadiene,
2-tert-butyl cyclopentadiene,
2-amyl-cyclopentadiene,
2-eicosyl cyclopentadiene,
1-ethenyl cyclopentadiene,
2(2-propenyl)cyclopentadiene,
2(2-butenyl)cyclopentadiene,
2(2-phenylethyl)cyclopentadiene,
2(2-phenyl-1-propenyl)cyclopentadiene,
2-cyclohexyl cyclopentadiene,
dicyclopentadiene,
2,5-dimethyl dicyclopentadiene,
2-phenyl cyclopentadiene,
2-naphthyl cyclopentadiene,
2-o-tolyl cyclopentadiene,
indene,
fluorene,
1-methyl indene,
2-methyl indene,
3-ethyl indene,
2,3-dipropyl indene,
3,4,5,6-tetrahydroindene,
3,6-dimethyl indene,
1,2,3,4,5,6,7,8-octahydrofluorene,
9-methyl fluorene,
3,6-diethyl fluorene, and the like.

The process of this invention as illustrated in the examples given hereinabove can be employed to make other cyclopentadienyl-type compounds of the metal and metalloid elements of Groups IB, IIB, IIIA, IIIB, IVA, IVB, VA, VB, VIB and VIIB. Non-limiting examples of such products are: 2-n-amyl cyclopentadienyl thallium which can be obtained by the reaction of 2-n-amyl cyclopentadienyl lithium with thallium bromide; tris(2,3-diethyl cyclopentadienyl)scandium which can be obtained by the reaction of 2,3-diethyl cyclopentadienyl sodium with scandium trichloride; tris(2-benzyl cyclopentadienyl)aluminum which can be obtained by the reaction of 2-benzyl cyclopentadienyl potassium with aluminum trichloride; bis(3-benzyl cyclopentadienyl) tin dichloride which can be obtained by the reaction of 3-benzyl cyclopentadienyl lithium with stannic chloride; bis(cyclopentadienyl)lead dichloride which can be obtained by the reaction of cyclopentadienyl sodium with lead tetrachloride; bis(cyclopentadienyl)zirconium dibromide which can be obtained by the reaction of cyclopentadienyl sodium with zirconium tetrabromide; bis(cyclopentadienyl)vanadium dibromide which can be obtained by the reaction of cyclopentadienyl lithium with vanadium tetrabromide; bis(4-phenyl fluorenyl)manganese dibromide which can be obtained by the reaction of 4-phenyl fluorenyl rubidium with manganese tetrabromide; 2,3-dimethyl cyclopentadienyl copper which can be obtained by the reaction of 2,3-dimethyl cyclopentadienyl lithium with copper chloride; diindenyl zinc which can be obtained by the reaction of indenyl sodium with zinc iodide; and the like.

Examples of still other products that can be obtained by the process of our invention include the following:

cyclopentadienyl thallium,
2-n-amyl-cyclopentadienyl thallium,
3,4-di-(1-methyl-butyl)-cyclopentadienyl thallium,
2,3,4-trimethylcyclopentadienyl thallium,
1,2,3,4-tetraethyl-cyclopentadienyl thallium,
cyclopentadienyl gallium,
3,4-di-n-octyl-cyclopentadienyl gallium,
2-ethenyl-cyclopentadienyl gallium,
3-($\Delta^1$-propenyl)-cyclopentadienyl gallium,
3,4-di-isopropenyl-cyclopentadienyl gallium,
cyclopentadienyl indium,
2-isopropyl-3-$\Delta^2$-butenyl-cyclopentadienyl indium,
tri(cyclopentadienyl)scandium,
tri-(2,3-diethyl-cyclopentadienyl)scandium,
(2-methyl-cyclopentadienyl)-di-(3-ethyl-cyclopentadienyl)scandium,
(2-ethyl-cyclopentadienyl)-(3-ethyl-cyclopentadienyl)-(4-ethyl-cyclopentadienyl)scandium,
2-($\beta$-naphthyl)-cyclopentadienyl thallium,
3-methyl-4-phenyl-cyclopentadienyl thallium,
2,3-dimethyl-4-phenyl-cyclopentadienyl thallium,
3,4-diphenyl-cyclopentadienyl gallium,
3,5-diphenyl-cyclopentadienyl indium,
tri-(4-($\alpha$-phenylethyl)-cyclopentadienyl)yttrium,
tri-(3-($\beta$-phenylethyl-cyclopentadienyl)lanthanum,
di-(3-o-ethylphenyl-cyclopentadienyl)copper,
2-m-ethylphenyl-cyclopentadienyl silver, and the like.

The process of this invention can be carried out at atmospheric pressure although much lower and also much higher pressures can also be used. The temperature at which this process can be conducted varies from about —100° C. to about 300° C. although both lower and higher temperatures can be employed. The upper and lower limits are restricted by the solvent in which the reaction is carried out, if a solvent is used. Where no solvent is used the upper temperature limit is dependent upon the temperature at which decompositions or polymerization of one or more of the components, such as of the cyclopentadienyl-type alkali metal compound reagents or of the products, occurs. In general, we prefer to conduct our process in the temperature range of from about —20° C. to about 100° C. When using diethyl ether as a solvent we especially prefer to conduct the reaction in the temperature range of from about —10° C. to about 34° C.

In carrying out the process of this invention the reagents can be reacted without the presence of any solvent or diluent. However, it is preferred to use a solvent in order to facilitate contact between the reagents and to moderate the reaction rate. The solvent chosen should be one which does not react with either the cyclopentadienyl-type alkali metal compounds or the halides of the Groups IB, IIB, IIIA, IIIB, IVA, IVB, VA, VB, VIB and VIIB metal and metalloid elements. One class of compounds found to be suitable as a solvent is the ethers, non-limiting examples of which are methylethyl ether, diethyl ether, dibutyl ether, allylethyl ether, amylethyl ether, anisole, benzylethyl ether, phenylethyl ether, butyl-o-tolyl ether, dioxane, and also various mixtures of different ethers. Another class of substances is the aromatic and substituted aromatic compounds such as benzene, naphthalene, anthracene, toluene, ethylbenzene, the xylenes and various other hydrocarbon substituted benzenes, anthracenes and the like. Mixtures of ether and aromatic hydrocarbons can also be employed as solvents. In addition to the above, mixtures of aliphatic hydrocarbons such as pentanes, hexanes, cyclohexanes, octanes, and the like, can be employed in conjunction with an ether and/or an aromatic hydrocarbon or with a mixture of the latter two in making up a suitable solvent in which to conduct the reaction of this process. A guide in the selection of a solvent will be the consideration of such factors as the temperature at which the reaction is desired to be conducted, the solubility of one or both of the reactants in that solvent as well as the solubility of the product which is formed, and the like.

In the commercial production of the compound of our invention it is particularly attractive to conduct the process in a continuous manner. This can be done by a variety of techniques such as passing the reactants either substantially pure or admixed with an inert carrier or solvent through a reaction zone. The product stream can be treated as described hereinabove in order to separate the products and unreacted materials. The continuous method for conducting the process of this invention can be carried out either in a "once through" manner or with recycling of reactants and products. In continuous and batch modifications of our invention, the reactants can be diluted with inert gases or liquids such as propane, ethane, nitrogen, helium, hexane, octane, an ether, an aromatic hydrocarbon, various mixtures of the above, and the like.

The compounds that can be made by the process of this invention have a variety of uses. For example, they can be employed as fuel additives to improve the anti-knock quality as well as other characteristics of fuels for internal combustion engines. Other uses include those of heat transfer agents, chlorination catalysts, intermediates for the syntheses of chemicals possessing therapeutic value, and as dielectric materials in various electrical instruments.

We claim:

1. A process for the manufacture of cyclopentadienyl moiety-containing compounds of the metal and metalloid elements of Group IIIA comprising reacting cyclopentadienyl alkali metal compounds with a halide salt of one of the metal and metalloid elements of Group IIIA.

2. A process for the manufacture of cyclopentadienyl moiety-containing compounds of the metal and metalloid elements of Group IIIB comprising reacting cyclopentadienyl alkali metal compounds with a halide salt of one of the metal and metalloid elements of Group IIIB.

3. A process for the manufacture of cyclopentadienyl moiety-containing compounds of the metal and metalloid elements of Group VB comprising reacting cyclopentadienyl alkali metal compounds with a halide salt of one of the metal and metalloid elements of Group VB.

4. A process for the manufacture of cyclopentadienyl moiety-containing compounds of the metal and metalloid elements of Group VIB comprising reacting cyclopentadienyl alkali metal compounds with a halide salt of one of the metal and metalloid elements of Group VIB.

5. A process for preparing dicyclopentadienyl chromium halide which comprises reacting chromium halide with a cyclopentadienyl alkali metal compound at elevated temperatures.

6. The process of preparing dicyclopentadienyl chromium bromide which comprises reacting chromium tribromide with cyclopentadienyl lithium at elevated temperatures.

7. The process of preparing dicyclopentadienyl chromium bromide which comprises reacting anhydrous chromium tribromide with cyclopentadienyl lithium at elevated temperatures.

References Cited in the file of this patent

Chemistry and Industry, March 13, 1954, pages 307 and 308.

Zeit. für Natur., Band 8b, Heft 5, pages 217–219, May 1953.